Patented Aug. 24, 1954

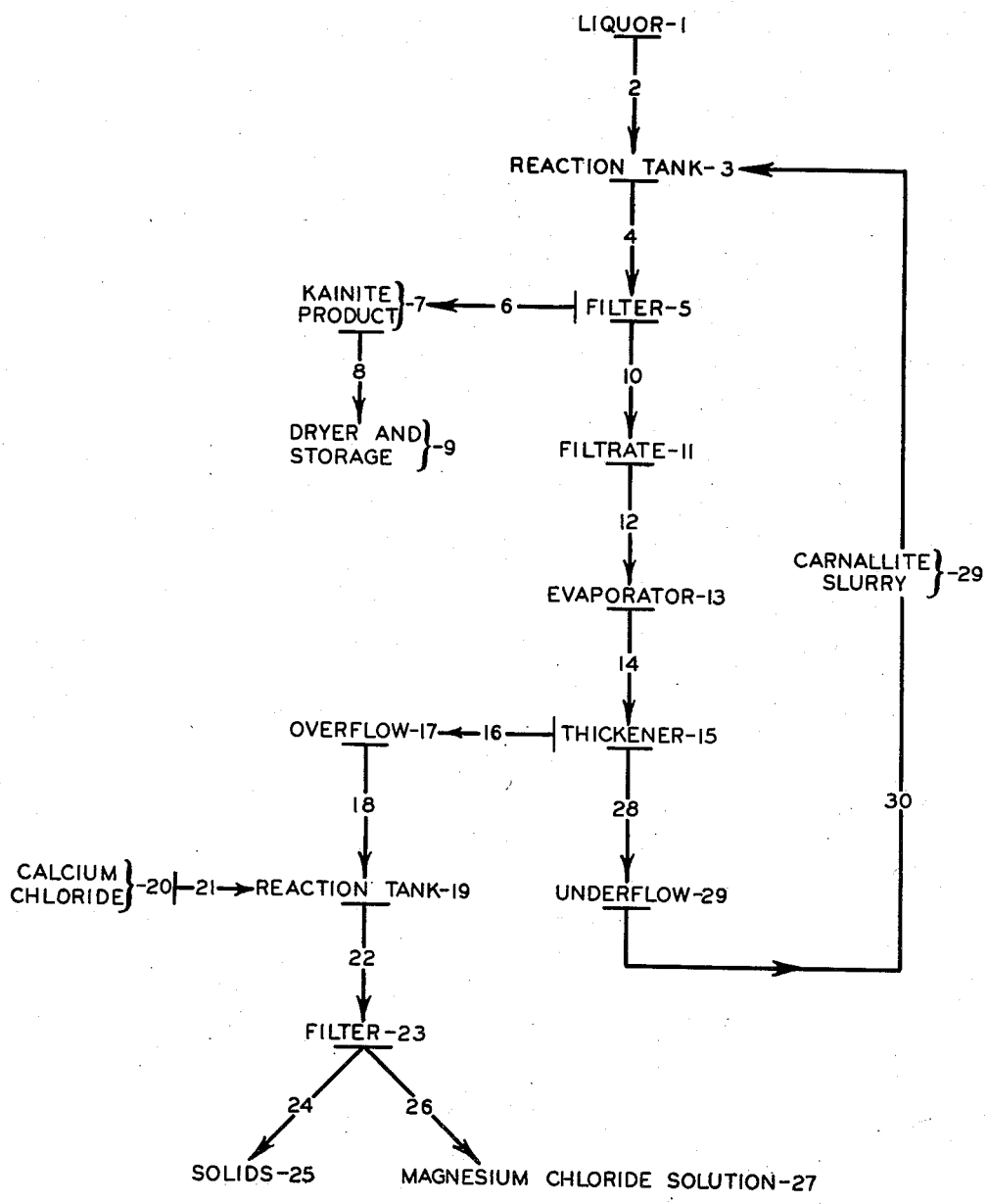

2,687,339

UNITED STATES PATENT OFFICE 2,687,339

PROCESS FOR THE TREATMENT OF LIQUORS TO RECOVER POTASSIUM AND MAGNESIUM VALUES

William B. Dancy and Robert A. MacDonald, Carlsbad, N. Mex., assignors to International Minerals & Chemical Corporation, a corporation of New York Application January 8, 1951, Serial No. 204,983

11 Claims. (Cl. 23—38)

This application relates to processes for the treatment of liquors to recover potassium and magnesium values therefrom, and more particularly to processes for the treatment of potassium sulfate reject liquors or their equivalents to recover potassium and magnesium compounds therefrom.

In the processes of producing potassium sulfate by the base exchange or metathesis of the magnesium content of langbeinite with the potassium content of potassium chloride, there is produced a mother liquor from which the potassium sulfate crystals have been separated. This mother liquor is usually evaporated and cooled in order to separate potassium chloride and leonite crystals from the liquor. The liquor from which the crystalline salts have been removed has heretofore been sent to waste even though it contains magnesium and potassium compounds. It would be desirable to recover saleable magnesium and potassium products from such reject liquors.

It is an object of the instant invention to recover the potassium and/or the magnesium compounds from liquors containing chlorides and sulfates of magnesium and potassium.

It is a further object of the instant invention to recover saleable potash and magnesium products from potassium sulfate reject liquors or their equivalents.

It is a further object to recover potash salts, substantially free of magnesium chloride, and a magnesium chloride solution from potassium sulfate reject liquors or their equivalents.

It is a further object of the instant invention to recover potash salts, substantially free of magnesium chloride, and a magnesium chloride solution, which may be processed to obtain other magnesium chemicals, from potassium sulfate reject liquors or their equivalents.

These objects and other objects of the instant invention will become more apparent upon a fuller understanding of the invention as hereinafter set forth.

The instant invention involves the treatment of liquors or solutions containing chlorides and sulfates of magnesium and potassium under conditions hereindescribed with a carnallite slurry under conditions which result in the formation of kainite ($KCl.MgSO_4.3H_2O$) and a magnesium chloride solution. The solid kainite salts are separated from the magnesium chloride solution. The potash salts can be employed as a fertilizer product. The magnesium chloride solution can be further processed into magnesium chemicals as desired.

Acccording to the general method employed in the instant invention for the recovery of potash values as kainite salts, and of magnesium values as magnesium chloride from solutions or liquors containing chlorides and/or sulfates of magnesium and of potassium, the liquor is mixed with a slurry, the solid phase of which comprises carnallite ($KCl.MgCl_2.6H_2O$), and the aqueous phase of which is substantially saturated with respect to magnesium chloride. Magnesium chloride from the carnallite results in an increase of the magnesium chloride concentration in the solution, and kainite salts are crystallized. The formation of kainite crystals is accompanied with a reduction of the sulfate ion concentration in the magnesium chloride solution. The kainite salts are separated from the magnesium chloride solution, which is evaporated to a point near saturation with respect to bischofite. Sodium chloride and kieserite in addition to carnallite crystallize from the solution which is then decanted or thickened, for example, in the conventional type thickener which effects the separation of liquid substantially free of solids from a mixture containing liquid and solids. The underflow from the thickener, which contains the solid phase salts, is recycled to the initial step of the process, in which kainite is formed. The kieserite present in the salts is thought to react with potassium chloride to form additional kainite. The overflow from the thickener, a concentrated magnesium chloride solution, is further processed to produce magnesium chemicals.

The liquors which are used as feed materials contain chlorides and/or sulfates of magnesium and of potassium. In one embodiment of the instant invention, potassium sulfate reject liquors, such as reject liquors produced in base exchange processes as above-described, and reject liquors produced in processes such as are described and claimed in U. S. Serial No. 166,715, filed June 7, 1950, U. S. 2,295,257, issued to Butt et al., and the like, are used. A typical potassium sulfate reject liquor suitable for the practice of the instant invention contains between about 5.3% and about 6.7% by weight of potassium chloride, between about 1.8% and about 3.3% by weight of sodium chloride, between about 6.2% and about 7.5% by weight of magnesium sulfate, between about 15.5% and 18.3% by weight of magnesium chloride, and between about 66.0% and about 68.0% by weight of water.

It is not essential in the kainite forming step, that is, in the admixing of a slurry whose aqueous phase is substantially saturated with respect to magnesium chloride and whose solid phase contains carnallite and kieserite and minor amounts of sodium chloride, that kieserite and sodium chloride be present. The instant process may be practiced and is usually initiated by adding a substantially saturated solution of magnesium chloride which contains a suspension of carnallite to potassium sulfate reject liquor or equivalent liquors without substantially altering the over-all process. The presence of kieserite in the slurry increases the yield of kainite and thus increases the reaction efficiency. Thus in the preferred embodiment of the instant novel process, the slurry containing carnallite and kieserite obtained as above-described as underflow from the thickener is recycled to the kainite formation step.

In the kainite formation step, sufficient carnallite slurry is added to the potassium sulfate reject liquor so that the resulting liquor will be nearly saturated with respect to carnallite. For example, kainite is obtained by mixing between about 1.15 and about 1.35 parts by weight of potassium sulfate reject liquor per part of carnallite slurry. Kainite is formed in the above-described slurry at a temperature of between about 10° C. and about 85° C. However, the reaction is preferably carried out at a temperature of between about 60° C. and about 85° C. Although kainite is formed in the slurry throughout the entire temperature range mentioned above, the rate of formation of kainite is sufficiently rapid to be commercially feasible only at temperatures of above about 60° C. The kainite salts, which are separated from the solution, have a $K_2O$ content of about 22% and magnesium oxide content of about 15%.

After the removal of the kainite salts from the magnesium chloride solution, said solution is evaporated to a point near saturation with respect to bischofite, that is to a magnesium chloride concentration of between about 36.0% and about 40% by weight. The evaporation is usually carried out at a temperature above about 60° C., preferably at a temperature between about 115° C. and about 120° C. The resulting mixture is then cooled and thickened, preferably at a temperature of about 90° C., which is the maximum temperature for this thickening step. However, temperatures below about 90° C. may also be employed for the thickening step. If the evaporation is carried out at a temperature above about 90° C., the concentrated mixture is cooled and thickened at a temperature below about 90° C. If the evaporation is carried out at a temperature below about 90° C., the slurry is thickened at the evaporating temperature without additional cooling.

In the preferred embodiment, the instant process comprises the steps of adding a slurry of carnallite, the aqueous phase of which is substantially saturated with respect to magnesium chloride, to a potassium sulfate reject liquor or equivalent liquor at a temperature of between about 60° C. and about 85° C. The resulting mixture is agitated for between about two and about four hours or until the formation of kainite is substantially complete. The salts produced comprise kainite, potassium chloride, and sodium chloride and are removed from the magnesium chloride liquor, for example, by filtration. This product is suitable for use as a fertilizer composition or component. The liquor from which the solid product has been removed is evaporated to a magnesium chloride concentration of between about 36% and about 40% by weight at a temperature of between about 115° C. and about 120° C. and is thickened at a temperature of about 90° C. The underflow from the thickener is recycled to the step in which kainite is formed, and the overflow, which is a concentrated magnesium chloride solution, is further processed to recover its magnesium value.

In a further embodiment of the instant novel process, potassium sulfate reject liquor is allowed to react with a hot slurry, obtained from a subsequent step of the process as herein-described, which comprises solid phase carnallite and minor amounts of kieserite and sodium chloride in a solution of magnesium chloride. The mixture is heated at a temperature of between about 60° C. and about 85° C. for between about two and about four hours. The carnallite and kieserite are dissolved in the liquor, and a mixture of salts, comprising kainite with minor amounts of potassium chloride and sodium chloride, are crystallized. These salts are separated from the resulting solution by filtration and are washed and dried. The kainite salts have a typical analysis as follows:

| | Percent by weight |
|---|---|
| Potassium chloride | 34.97 |
| Magnesium sulfate | 44.67 |
| Sodium chloride | 19.77 |

The salts analyzed about 22.09% potassium oxide and about 15% magnesium oxide. About 92.7% of the potassium oxide is recovered in the form of kainite salts.

The solution from which the salts have been separated is then evaporated to a point near saturation with respect to bischofite, for example, the solution is evaporated to a magnesium chloride concentration of between about 36% and about 40% by weight. During this evaporation, carnallite and some kieserite and sodium chloride are crystallized from the solution. The evaporation is carried out at a temperature above about 60° C., and usually water is removed to the extent of approximately 25% of the feed solution, but more or less water is driven off, depending on the concentration of dissolved solids therein. The evaporated slurry is then decanted, for example, in a conventional type thickener to produce in the underflow a slurry of approximately 45% solids. This carnallite slurry is recycled to the step in which kainite is formed. The concentrated magnesium chloride solution, which overflows the thickener, is treated with calcium chloride to remove additional amounts of sulfate and is then processed into magnesium chemicals. The magnesium chloride liquor from the thickener has a typical composition approximately as follows:

| | Percent by weight |
|---|---|
| Magnesium chloride | 36.07 |
| Magnesium sulfate | 1.80 |
| Sodium chloride | 0.51 |
| Potassium chloride | 0.65 |
| Water | 60.89 |

This liquor is further purified for use in the preparation of magnesium compounds by adding an excess of calcium chloride to the solution at an elevated temperature and removing the solids which are formed. The calcium chloride treated liquor will have approximately the following analysis:

| | Percent by weight |
|---|---|
| Magnesium | 9.65 |
| Chloride | 28.44 |

| | Percent by weight |
|---|---|
| Potassium | 0.10 |
| Sodium | 0.17 |
| Sulfate | 0.07 |
| Water | 61.50 |

For a more complete understanding of the instant novel process, reference may be had to the figure which is a flow sheet of a preferred embodiment of the instant novel process.

A potassium sulfate reject liquor 1 is allowed to enter reaction tank 3 by means of line 2. Carnallite slurry underflow 29 from the thickener 15 enters reaction tank 3 by means of line 30. The mixture is agitated and allowed to react at a temperature of between about 60° C. and about 85° C. until kainite formation is substantially complete. Thereafter the reacted mixture is transferred to filter 5 by means of line 4. The solid kainite product is removed from filter 5 by means of line 6. The kainite product 7 is conveyed to dryer and storage 9 by line 8.

The filtrate 11 is transferred from filter 5 by line 10 and is conveyed to evaporator 13 by line 12. The filtrate 11 is evaporated to between about 36% and about 40% by weight of magnesium chloride at a temperature above about 60° C.

The concentrated liquor is then transferred by line 14 to thickener 15 where it is cooled to at least below about 90° C. and thickened. The concentrated magnesium chloride solution 17 which overflows from the thickener 15 by line 16 is transferred by line 18 to reaction tank 19 and calcium chloride 20 is likewise conveyed to the same through line 21. The reacted mixture is conveyed by line 22 to filter 23. Solid calcium compounds 25 are removed by line 24, and the concentrated, purified magnesium chloride solution 27 which is obtained by line 26 is processed into magnesium chloride chemicals. The underflow 29 from thickener 15 is a slurry of about 45% solids, the solids of which comprise carnallite, kieserite, and sodium chloride. Underflow 29 is removed from the thickener 15 by line 28 and is returned by line 29 to reaction tank 3 for use in the reaction as previously described.

In order to more fully illustrate the nature and character of the instant invention, but with no intention of being limited thereto, the following example is given.

EXAMPLE

About 121 parts by weight of potassium sulfate reject liquor having the composition indicated in Table I was added to about 100 parts by weight of a thickened slurry of crude carnallite salts and carnallite mother liquor of the composition indicated in Table I. The resulting mixture was agitated at a temperature of about 65° C. until the sulfate concentration of the liquor had been reduced to below about 2%. The kainite salts which crystallized were separated from the liquor. The kainite liquor was then evaporated at a temperature of about 115° C. to a magnesium chloride concentration of about 36% by weight. The slurry discharged from the evaporator was thickened in a conventional type thickener at a temperature of about 90° C. The underflow from the thickener was recycled to the kainite formation step. The magnesium chloride solution overflow was then treated with calcium chloride at a temperature of between about 85° C. and about 95° C. About 1.7 parts of calcium chloride per 100 parts of concentrated liquor were used. The solids which formed were removed by filtration from the purified magnesium chloride solution and discarded. Table I shows the analysis of the materials used and recovered.

*Table I.—Analysis of materials (weight percent)*

| Material | Temp., °C. | K | Mg | Na | Cl | SO₄ | H₂O |
|---|---|---|---|---|---|---|---|
| Reject Liquor | | 3.40 | 5.44 | 1.12 | 16.84 | 5.19 | 68.01 |
| Thickener Overflow | 90 | 0.26 | 9.57 | 0.38 | 27.44 | 1.75 | 60.60 |
| Thickener Underflow | 90 | 6.01 | 8.94 | 1.29 | 32.20 | 1.78 | 49.78 |
| Kainite Liquor | 65 | 3.02 | 6.96 | 0.79 | 22.90 | 1.84 | 64.49 |
| Unwashed Product (Solids) | | 14.19 | 8.54 | 3.98 | 21.00 | 31.00 | 21.18 |
| Water-Washed Product (Solids) | | 14.26 | 8.25 | 3.32 | 18.80 | 31.58 | 23.79 |

Table II shows the estimated composition of the kainite salts.

*Table II.—Estimated composition of kainite salts*

| Material | Kainite | KCl | MgCl₂ | NaCl | H₂O |
|---|---|---|---|---|---|
| Unwashed | 80.66 | 2.91 | 2.60 | 10.14 | 3.69 |
| Water-Washed | 81.85 | 2.68 | 1.00 | 8.44 | 6.03 |

The water-washed product salts were substantially free of carnallite. Water washing the salts removed carnallite liquor and reduced the magnesium content of the solids from about 2.6% to about 1.0%.

Having thus fully described and illustrated the character of the invention, what is desired to be secured and claimed by Letters Patent is:

1. A process for the treatment of potassium sulfate reject liquor which comprises treating a potassium sulfate reject liquor comprising essentially sulfate, chloride, magnesium and potassium ions with carnallite suspended in an aqueous medium substantially saturated with respect to magnesium chloride, at a temperature of between about 60° C. and about 85° C., and separating kainite from the resulting mixture upon substantial completion of the reaction.

2. A process for the treatment of liquors which comprises treating a liquor comprising essentially sulfate, chloride, magnesium, and potassium ions with carnallite suspended in an aqueous medium substantially saturated with respect to magnesium chloride, at a temperature of between about 60° C. and about 85° C., separating kainite from the resulting mixture upon substantial completion of the kainite-forming reaction, evaporating the liquor from which the kainite has been separated to a point near saturation with respect to bischofite, and separating solids from the resulting mixture to obtain a concentrated magnesium chloride solution.

3. A process for the treatment of liquors which comprises treating a potassium sulfate reject liquor with carnallite suspended in an aqueous medium substantially saturated with respect to magnesium chloride, at a temperature of between about 60° C. and about 85° C., separating kainite from the resultant mixture upon substantial completion of the kainite-forming reaction, evaporating the liquor from which the kainite has been separated to a point near saturation with respect to bischofite, and decanting the resulting mixture to obtain a concentrated magnesium chloride solution and a slurry containing kieserite and carnallite.

4. A process for the treatment of potassium sulfate reject liquor which comprises treating a potassium sulfate reject liquor with carnallite suspended in an aqueous medium substantially saturated with respect to magnesium chloride, at a temperature of between about 60° C. and about 85° C. for between about two and about four hours, separating kainite from the resultant mixture, evaporating the liquor from which kainite has been separated at a temperature above about 60° C., to a point near saturation with respect to bischofite, cooling the resulting mixture, and decanting the resultant slurry to obtain a concentrated magnesium chloride solution and a slurry containing kieserite and carnallite.

5. A process for the treatment of potassium sulfate reject liquor which comprises treating a potassium sulfate reject liquor with a slurry whose aqueous phase is substantially saturated with respect to magnesium chloride, and whose solid phase comprises kieserite and sufficient carnallite to produce saturation with respect to carnallite in the resulting reaction mixture, at a temperature between about 60° C. and about 85° C., separating kainite from the resulting mixture upon substantial completion of the kainite-forming reaction, evaporating the liquor from which the kainite has been separated to a point near saturation with respect to bischofite, and cooling and decanting the resulting mixture to obtain a concentrated magnesium chloride solution and a slurry containing kieserite and carnallite.

6. A process for the treatment of liquors which comprises treating a liquor comprising essentially sulfate, chloride, magneisum, and potassium ions with carnallite suspended in an aqueous medium substantially saturated with respect to magnesium chloride, at a temperature of between about 60° C. and about 85° C., separating kainite from the resulting mixture upon substantial completion of the kainite-forming reaction, evaporating the liquor from which the kainite has been separated to a point near saturation with bischofite, decanting the resulting mixture to obtain a concentrated magnesium chloride solution and a slurry containing kieserite and carnallite, treating the concentrated magnesium chloride solution with calcium chloride, and removing the resulting solids from the purified magnesium chloride solution.

7. The process for the treatment of liquors of claim 6 wherein the slurry containing kieserite and carnallite is recycled to the reaction mixture.

8. A process for the treatment of liquors which comprises treating a potassium sulfate reject liquor with carnallite suspended in an aqueous medium substantially saturated with respect to magnesium chloride, at a temperature of between about 60° C. and about 85° C. for between about two and about four hours, separating kainite from the resulting mixture, evaporating the liquor from which the kainite has been separated at a temperature above about 90° C. to a point near saturation with respect to bischofite, cooling the resulting mixture to a temperature at least below about 90° C., decanting the resultant mixture to obtain a concentrated magnesium chloride solution and a slurry containing kieserite and carnallite, treating the concentrated magnesium chlo-ride solution with calcium chloride, and removing the resulting solids from the purified magnesium chloride solution.

9. A process for the treatment of liquors which comprises treating a potassium sulfate reject liquor with carnallite suspended in an aqueous medium substantially saturated with respect to magnesium chloride, at a temperature between about 60° C. and about 85° C. for between about two and about four hours, separating kainite from the resulting mixture, evaporating the liquor from which the kainite has been separated at a temperature of between about 115° C. and about 120° C. to a point near saturation with respect to bischofite, cooling the resulting mixture to a temperature of about 90° C., decanting the resultant mixture to obtain a concentrated magnesium chloride solution and a slurry containing kieserite and carnallite, and recycling the slurry to the kainite-forming reaction mixture.

10. A process for the treatment of liquors which comprises treating a potassium sulfate reject liquor with carnallite suspended in an aqueous medium substantially saturated with respect to magnesium chloride, at a temperature of between about 60° C. and about 85° C. for between about two and about four hours, separating kainite from the resulting mixture, evaporating the liquor from which the kainite has been separated at a temperature between about 115° C. and about 120° C. to a point near saturation with respect to bischofite, cooling the resulting mixture to a temperature of about 90° C., decanting the resultant mixture to obtain a concentrated magnesium chloride solution and a slurry containing kieserite and carnallite which is recycled to the kainite-forming reaction mixture, treating the concentrated magnesium chloride solution with calcium chloride, and removing the resulting solids from the purified magnesium chloride solution.

11. A process for the treatment of liquors which comprises treating a potassium sulfate reject liquor with a slurry whose aqueous phase is substantially saturated with respect to magnesium chloride, and whose solid phase comprises carnallite and kieserite, at a temperature between about 60° C. and about 85° C. for between about two and about four hours, separating kainite from the resulting mixture, evaporating the liquor from which the kainite has been separated at a temperature between about 115° C. and about 120° C. to a point near saturation with bischofite, cooling the resulting mixture to a temperature of about 90° C., decanting the resultant mixture to obtain a concentrated magnesium chloride solution and a slurry containing kieserite and carnallite which is recycled to the kainite-forming reaction mixture, treating the concentrated magnesium chloride solution with calcium chloride, and removing the resulting solids from the purified magnesium chloride solution.

References Cited in the file of this patent

UNITED STATES PATENTS

| Number | Name | Date |
|---|---|---|
| 1,801,661 | Collins | Apr. 21, 1931 |
| 2,479,001 | Burke et al. | Aug. 16, 1949 |

FOREIGN PATENTS

| Number | Country | Date |
|---|---|---|
| 676,406 | Germany | June 3, 1939 |